(12) United States Patent
Takahashi et al.

(10) Patent No.: US 12,409,633 B2
(45) Date of Patent: Sep. 9, 2025

(54) STRUCTURE AND EXTERIOR HOUSING

(71) Applicants: SONY GROUP CORPORATION, Tokyo (JP); TOHOKU UNIVERSITY, Miyagi (JP)

(72) Inventors: Yuichi Takahashi, Tokyo (JP); Gen Yonezawa, Tokyo (JP); Shohei Abe, Tokyo (JP); Takehito Shimatsu, Miyagi (JP); Miyuki Uomoto, Miyagi (JP)

(73) Assignees: Sony Group Corporation, Tokyo (JP); Tohoku University, Miyagi (JP)

( * ) Notice: Subject to any disclaimer, the term of this patent is extended or adjusted under 35 U.S.C. 154(b) by 869 days.

(21) Appl. No.: 17/413,649

(22) PCT Filed: Dec. 19, 2019

(86) PCT No.: PCT/JP2019/049906
§ 371 (c)(1),
(2) Date: Jun. 14, 2021

(87) PCT Pub. No.: WO2020/145079
PCT Pub. Date: Jul. 16, 2020

(65) Prior Publication Data
US 2022/0032582 A1 Feb. 3, 2022

(30) Foreign Application Priority Data
Jan. 7, 2019 (JP) .............................. 2019-000663

(51) Int. Cl.
*B32B 7/12* (2006.01)
*B32B 15/20* (2006.01)
(Continued)

(52) U.S. Cl.
CPC .............. *B32B 17/061* (2013.01); *B32B 7/12* (2013.01); *B32B 15/20* (2013.01); *F21V 9/08* (2013.01);
(Continued)

(58) Field of Classification Search
CPC .......... B32B 7/12; B32B 5/14; B32B 2451/00
See application file for complete search history.

(56) References Cited

U.S. PATENT DOCUMENTS 4,435,090 A * 3/1984 Jaccard ................. G04G 21/08
368/32
2002/0003019 A1 * 1/2002 Goerenz ........... B32B 17/10036
156/106
(Continued)

FOREIGN PATENT DOCUMENTS

DE 102005004437 B4 9/2012
EP 2508952 A2 10/2012
(Continued)

OTHER PUBLICATIONS

English translation of Hirata et al. JP2015230701 obtained form the EPO espacenet on Oct. 2, 2023. (Year: 2023).*
(Continued)

*Primary Examiner* — Adam Krupicka
(74) *Attorney, Agent, or Firm* — Sheridan Ross PC

(57) ABSTRACT

A structure according to an embodiment of the present disclosure includes: a first substrate; a second substrate opposed to the first substrate; a bonding layer provided between the first substrate and the second substrate; and a first decorative layer provided between the first substrate and the second substrate.

17 Claims, 8 Drawing Sheets

(51) Int. Cl.
  *B32B 17/06* (2006.01)
  *F21V 9/08* (2018.01)
(52) U.S. Cl.
  CPC ....... *B32B 2250/02* (2013.01); *B32B 2255/06* (2013.01); *B32B 2255/205* (2013.01); *B32B 2255/28* (2013.01); *B32B 2307/412* (2013.01); *B32B 2311/04* (2013.01); *B32B 2311/24* (2013.01); *B32B 2315/08* (2013.01); *B32B 2451/00* (2013.01); *B32B 2457/20* (2013.01)

(56) References Cited

U.S. PATENT DOCUMENTS

| | | | |
|---|---|---|---|
| 2010/0279043 A1* | 11/2010 | Hsu | C09D 133/08 428/35.7 |
| 2011/0109591 A1 | 5/2011 | Kurokawa et al. | |
| 2016/0282522 A1* | 9/2016 | Schiavoni | B32B 17/10761 |

FOREIGN PATENT DOCUMENTS

| | | |
|---|---|---|
| JP | 2006264315 A | 10/2006 |
| JP | 2008151550 A | 7/2008 |
| JP | 2012-098785 | 5/2012 |
| JP | 2015-051452 | 3/2015 |
| JP | 2015-230701 | 12/2015 |
| JP | 2017-054517 | 3/2017 |
| JP | 2017-136770 | 3/2017 |

OTHER PUBLICATIONS

International Search Report prepared by the Japan Patent Office on Feb. 14, 2020, for International Application No. PCT/JP2019/049906.

* cited by examiner

STRUCTURE AND EXTERIOR HOUSING

CROSS REFERENCE TO RELATED APPLICATIONS

This application is a national stage application under 35 U.S.C. 371 and claims the benefit of PCT Application No. PCT/JP2019/049906 having an international filing date of 19 Dec. 2019, which designated the United States, which PCT application claimed the benefit of Japanese Patent Application No. 2019-000663 filed 7 Jan. 2019, the entire disclosures of each of which are incorporated herein by reference.

TECHNICAL FIELD

The present disclosure relates to a structure and an exterior housing which are each bonded by, for example, atomic diffusion bonding.

BACKGROUND ART

An exterior housing of an electronic apparatus generally includes a plurality of members. For example, an exterior housing of a smartphone, a wristwatch, a watch-type wearable device, or the like has, for example, a windshield (a glass windshield), a frame, and a back surface plate. Those members included in the exterior housing are fixed by a gasket made of a plastic or bonded by an adhesive including an organic material. The thus configured exterior housing has an issue in securing strength.

Incidentally, for example, an example is disclosed in which thick materials to be bonded, one or both of which each have a thickness of greater than or equal to 1.0 mm, are bonded to each other by atomic diffusion bonding.

CITATION LIST

Patent Literature

PTL 1: Japanese Unexamined Patent Application Publication No. 2015-51452

SUMMARY OF THE INVENTION

However, in the exterior housing of the smartphone, the wristwatch, the watch-type wearable device, or the like, an improvement in a design characteristic is desired in addition to securing a bonding strength between members.

It is desirable to provide a structure and an exterior housing each having a high bonding strength and a high design characteristic.

A structure according to one embodiment of the present disclosure includes: a first substrate; a second substrate opposed to the first substrate; a bonding layer provided between the first substrate and the second substrate; and a first decorative layer provided between the first substrate and the second substrate.

An exterior housing according to one embodiment of the present disclosure includes the above-described structure according to one embodiment of the present disclosure.

The structure according to one embodiment of the present disclosure and the exterior housing according to one embodiment of the present disclosure are each provided with the bonding layer and the first decorative layer, between the first substrate and the second substrate. The first substrate and the second substrate are opposed to each other. As a result, decoration is performed while the first substrate and the second substrate are bonded to each other.

MODES FOR CARRYING OUT THE INVENTION

Figure 1:
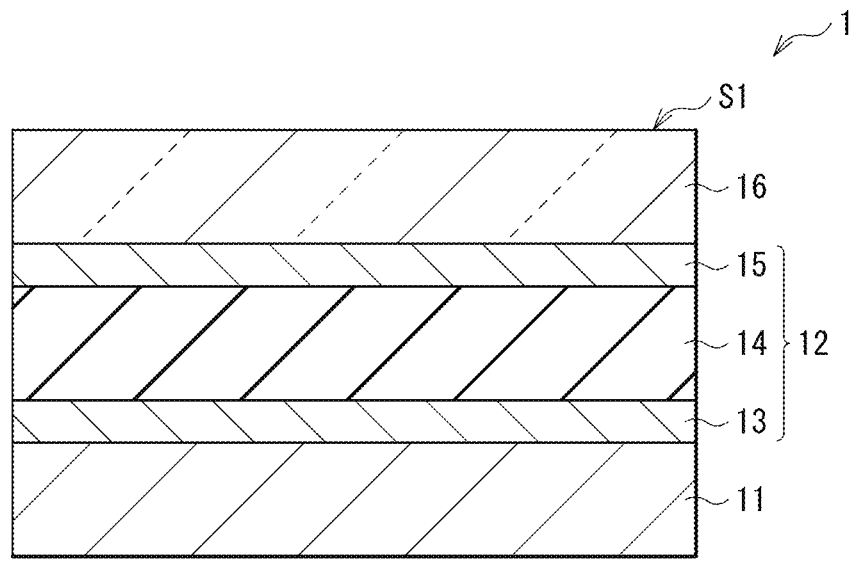
FIG. 1 is a cross-sectional schematic view of a configuration of a structure according to a first embodiment of the present disclosure.

In the following, embodiments of the present disclosure are described in detail with reference to the drawings. The following description is a specific example of the present disclosure, and the present disclosure is not limited to the following modes. In addition, the present disclosure is not limited to arrangement, dimensions, dimensional ratios, and the like of the components illustrated in the drawings. It is to be noted that description is given in the following order.
1. First Embodiment (An example of a structure in which a decorative characteristic is added to a bonding layer)
  1-1. Configuration of Structure
  1-2. Method of Manufacturing Structure
  1-3. Workings and Effects
2. Second Embodiment (An example of a structure in which a decorative layer including a dielectric multilayer film is provided on a base layer)
3. Modification Example 1 (An example of a structure which includes a decorative layer having thicknesses varied in an in-plane direction)

4. Third Embodiment (An example of a structure in which a decorative layer is provided on each of both sides of a bonding layer)
5. Modification Example 2 (An example of a structure in which a diffusion bonding layer is made transparent)
6. Modification Example 3 (An example of a structure in which a light source is added)
7. Working Examples 1. First Embodiment FIG. 1 schematically illustrates a cross-sectional configuration of a structure (a structure 1) according to a first embodiment of the present disclosure. In this structure 1, two or more members to be bonded have a stacked structure in which the members are bonded by, for example, atomic diffusion bonding. The stacked structure is included in, for example, an exterior housing of a smartphone, a wristwatch, a watch-type wearable device, or the like (see, for example, FIG. 13). The structure 1 according to the present embodiment includes: a substrate (a transparent substrate 16) having a light-transmitting property; a substrate 11 opposed to the transparent substrate 16; and a bonding layer 12 having a bonding function and a decorative function between the substrate 11 and the transparent substrate 16. The bonding layer 12 corresponds to a specific example of a "bonding layer" and a "first decorative layer" of the present disclosure.
(1-1. Configuration of Structure)

The structure 1 has the substrate 11 and the transparent substrate 16 bonded to each other by, for example, atomic diffusion bonding, and has a configuration in which the substrate 11, the bonding layer 12, and the transparent substrate 16 are stacked in this order. The bonding layer 12 includes, for example, a base layer 13, a diffusion bonding layer 14, and a base layer 15. The base layer 13, the diffusion bonding layer 14, and the base layer 15 are stacked in this order from a substrate 11 side.

The substrate 11 is, for example, a plate-shaped member having one surface and another surface opposed to each other, and corresponds to a specific example of a "second substrate" of the present disclosure. The substrate 11 includes, for example, a metal material. Examples of the metal material include stainless steel, aluminum, iron, copper, magnesium, and zinc.

The bonding layer 12 is for bonding the substrate 11 to the transparent substrate 16. As described above, the bonding layer 12 includes the base layers 13 and 15 and the diffusion bonding layer 14, and the base layer 13, the diffusion bonding layer 14, and the base layer 15 are stacked in this order from the substrate 11 side.

The base layer 13 is for improving adhesion between the substrate 11 and the diffusion bonding layer 14 in the bonding layer 12. The base layer 13 includes, for example, a metal material. The metal material is preferably a metal that is able to adhere strongly to the substrate 11 and to the transparent substrate 16, and examples thereof include titanium (Ti), vanadium (V), hafnium (Hf), tantalum (Ta), tungsten (W), nickel (Ni), niobium (Nb), zirconium (Zr), copper (Cu), palladium (Pd), and chromium (Cr), or alloys thereof. The base layer 13 is formed as a single-layer film or a stacked film in which one or two or more of the above materials are combined. A thickness in a stacking direction (hereinafter, simply referred to as thickness) of the base layer 13 is preferably greater than or equal to 0.5 nm and less than or equal to 200 nm, for example.

The diffusion bonding layer 14 is for bonding the substrate 11 to the transparent substrate 16 in the bonding layer 12. Further, the diffusion bonding layer 14 functions as a decorative layer in the structure 1 according to the present embodiment. The diffusion bonding layer 14 includes a metal material. Examples of the metal material include gold (Au), silver (Ag), copper (Cu), platinum (Pt), and palladium (Pa), or alloys including those as main components. One or two or more of the above materials may be combined and used as the diffusion bonding layer 14. It is to be noted that, in a case where bonding of the substrate 11 to the transparent substrate 16 is to be performed in an environment with little oxygen or water, such as a vacuum environment or an inert gas environment, the following may be used in addition to the above metal materials, for example, aluminum (Al), titanium (Ti), vanadium (V), chromium (Cr), iron (Fe), cobalt (Co), nickel (Ni), gold (Au), copper (Cu), zinc (Zn), gallium (Ga), germanium (Ge), zirconium (Zr), niobium (Nb), molybdenum (Mo), ruthenium (Ru), rhodium (Rh), palladium (Pd), silver (Ag), indium (In), tin (Sn), hafnium (Hf), tantalum (Ta), stainless steel, and the like. A thickness of the diffusion bonding layer 14 is preferably greater than or equal to 0.5 nm and less than or equal to 200 nm, for example. It is to be noted that the thickness of the diffusion bonding layer 14 may be greater than 200 nm. In a case where the thickness of the diffusion bonding layer 14 is greater than 200 nm, it is desirable to perform the bonding under a vacuum or inert gas condition with heating and pressurization.

The base layer 15 is for improving adhesion between the diffusion bonding layer 14 and the transparent substrate 16 in the bonding layer 12. The base layer 15 includes, for example, a metal material. The metal material is preferably a metal that is able to adhere strongly to glass, and examples thereof include titanium (Ti), tantalum (Ta), nickel (Ni), niobium (Nb), zirconium (Zr), copper (Cu), palladium (Pd), and chromium (Cr), or alloys thereof. The base layer 15 is formed as a single-layer film or a stacked film in which one or two or more of the above materials are combined. In a case where color development of the diffusion bonding layer 14, which also serves as a decorative layer, is to be seen from a transparent substrate 16 side, it is desirable that a thickness of the base layer 15 be such that light is transmitted, and is greater than or equal to 0.5 nm and less than or equal to 3 nm, for example. Further, in a case where color development of the base layer 15 is used for decoration, it is desirable that the thickness of the base layer 15 be such that light is not transmitted, and is greater than or equal to 3 nm and less than equal to 200 nm, for example.

In a case where the diffusion bonding layer 14 and the base layer 15 each have a decorative function, the diffusion bonding layer 14 and the base layer 15 respectively correspond to specific examples of the "first decorative layer" and a "second decorative layer" of the present disclosure.

The transparent substrate 16 is, for example, a plate-shaped member having one surface and another surface opposed to each other, and corresponds to a specific example of a "first substrate" of the present disclosure. The transparent substrate 16 includes an inorganic material or a plastic material having a light-transmitting property. Examples of the inorganic material include silicon oxide ($SiO_x$), silicon nitride ($SiN_x$), and aluminum oxide ($AlO_x$). Silicon oxide includes glass, spin-on-glass (SOG), or the like. Examples of the plastic material include polycarbonate (PC), polyethylene terephthalate (PET), polyethylene naphthalate (PEN), acrylic (PMMA), cycloolefin polymer (COP), and polyethyl ether ketone (PEEK).

(1-2. Method of Manufacturing Structure)

The structure 1 is manufacturable in the following manner, for example.

Figure 2A:
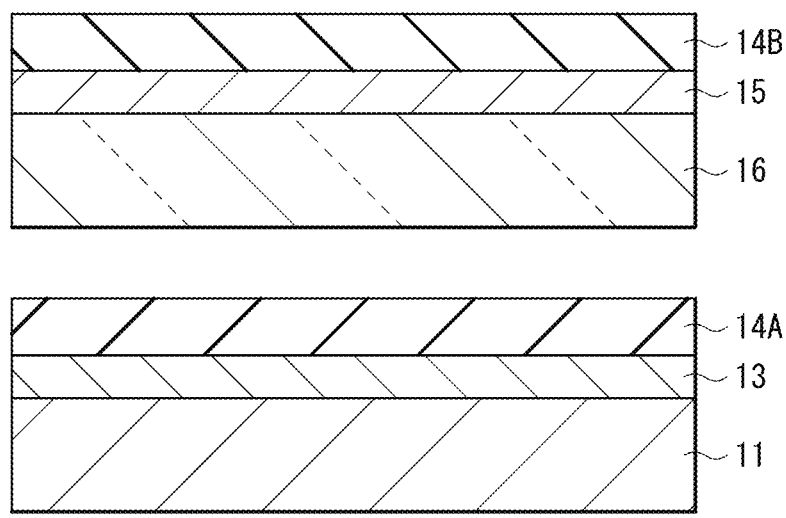
FIG. 2A is a cross-sectional schematic view of an example of a method of manufacturing the structure illustrated in FIG. 1.

First, as illustrated in FIG. 2A, a surface of the substrate 11 including an Al alloy is polished until an arithmetic average roughness (Ra) of the surface is less than 3 nm, for example. Thereafter, 2 nm, for example, of a film of tantalum (Ta) as the base layer 13 and 100 nm, for example, of a film of gold (Au) as a metal layer 14A to be the diffusion bonding layer 14 are formed over the substrate 11 by sputtering. Similarly, as illustrated in FIG. 2A, a surface of the transparent substrate 16 including a glass substrate is polished until an arithmetic average roughness (Ra) of the surface is less than 1 nm, for example. Thereafter, 1 nm, for example, of a film of tantalum (Ta) as the base layer 15 and 100 nm, for example, of a film of gold (Au) as a metal layer 14B to be the diffusion bonding layer 14 are formed over the transparent substrate 16 by sputtering.

Figure 2B:
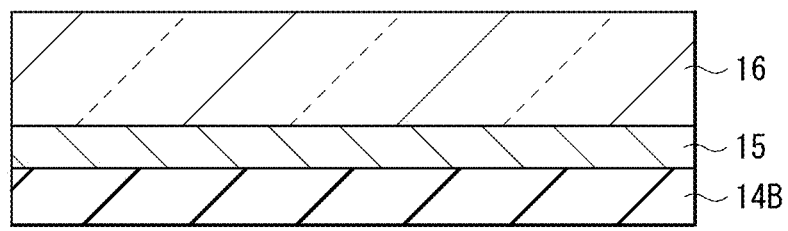
FIG. 2B is a cross-sectional schematic view of a process following FIG. 2A.
Figure 2B:
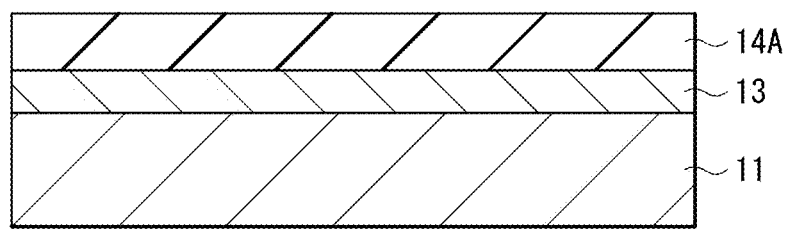
Figure 2C:
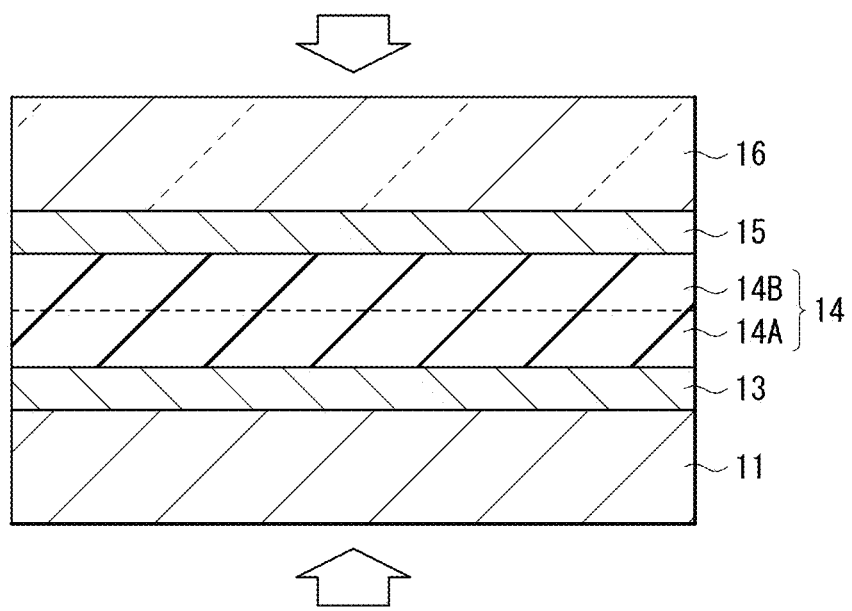
FIG. 2C is a cross-sectional schematic view of a process following FIG. 2B.

Thereafter, as illustrated in FIG. 2B, the substrate 11 and the transparent substrate 16 are disposed to oppose each other in such a manner that the metal layers 14A and 14B oppose each other. Next, as illustrated in FIG. 2C, the metal layers 14A and 14B are brought into contact with each other and are further pressurized at 30 MPa and heated at 150° C. for 10 minutes, for example. Thus, the metal layers 14A and 14B are bonded to each other and the structure 1 illustrated in FIG. 1 is completed.

In the structure 1 according to the present embodiment, the bonding layer 12 also serves as a decorative layer. Specifically, in the structure 1, in addition to the color development of the diffusion bonding layer 14, a reflection or absorption characteristic of the base layer 15 provided on the transparent substrate 16 side is used for decoration. Table 1 describes examples of materials and thicknesses of the respective members included in the structure 1. Table 2 summarizes chromaticity coordinates of reflected light obtained on a surface S1 side of the structure 1 including the base layer 15 (tantalum (Ta)) having each thickness under a D65 light source. It is to be noted that the substrate 11, the base layer 13, the diffusion bonding layer 14, and the transparent substrate 16 of the structure of Table 2 have configurations described in Table 1.

TABLE 1

|  | Material | Thickness |
| --- | --- | --- |
| Substrate 11 | Al | — |
| Base layer 13 | Ta | 1 nm |
| Diffusion bonding layer 14 | Au | 200 nm |
| Base layer 15 | Ta | 1/5/10/15 nm |
| Transparent substrate 16 | SiO$_2$ (glass) | — |

TABLE 2

| Thickness of Ta | D65 light source CIE1931 | |
| --- | --- | --- |
| (base layer 15) | x | y |
| 0 nm | 0.3994 | 0.4191 |
| 1 nm | 0.4102 | 0.4194 |
| 5 nm | 0.4255 | 0.4118 |
| 10 nm | 0.4364 | 0.3856 |
| 15 nm | 0.4168 | 0.3495 |

Figure 3:
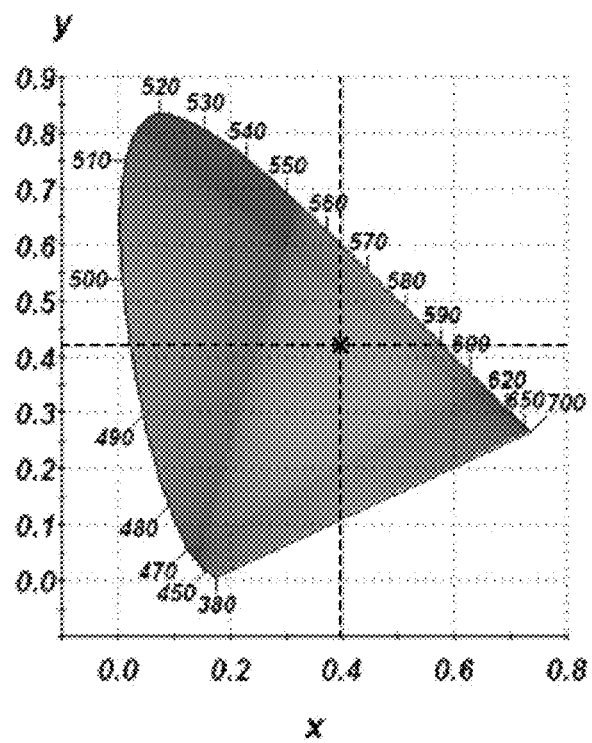
FIG. 3 is a chromaticity diagram of a gold film only.
Figure 4:
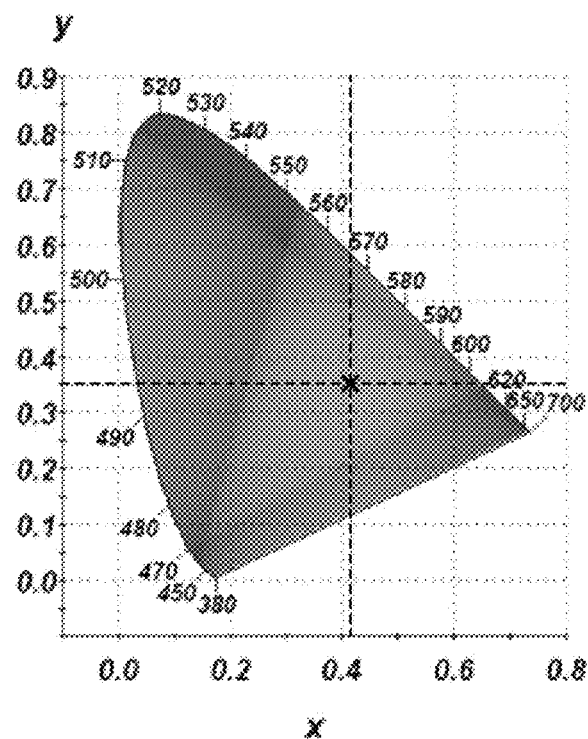
FIG. 4 is a chromaticity diagram in a case of stacking a tantalum film of 15 nm on a gold film.
Figure 5:
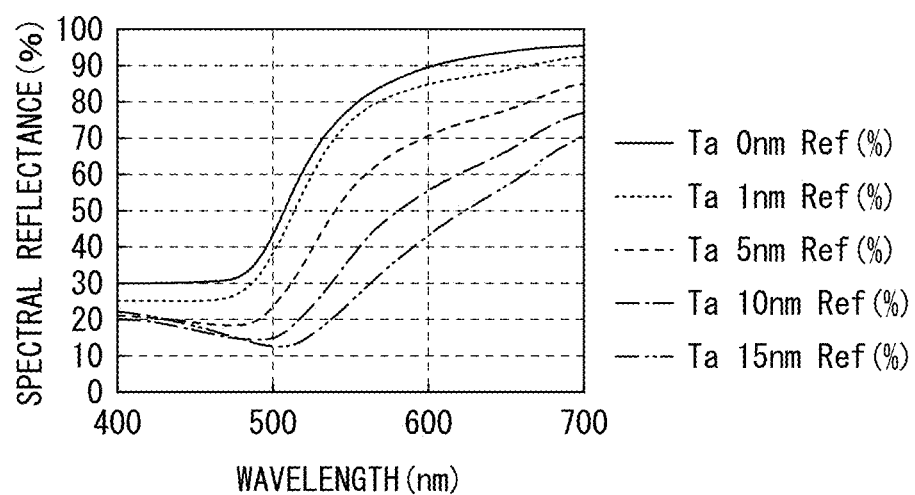
FIG. 5 is a spectral reflectance characteristic diagram of respective thicknesses of base layers, each of which is on a surface of the structure illustrated in FIG. 1.

FIG. 3 is a chromaticity diagram of reflected light obtained on the surface S1 side of the structure 1 where no base layer 15 is provided (the thickness of Ta (the base layer 15) is 0 nm). FIG. 4 is a chromaticity diagram of reflected light obtained on the surface S1 side of the structure 1 including Ta (the base layer 15) having a thickness of 15 nm. FIG. 5 illustrates a relationship between a wavelength and a spectral reflectance on the surface S1 side of the structure 1 including Ta (the base layer 15) having each thickness. As is apparent from FIGS. 3, 4, and 5 and Table 2, color development of the structure 1 on the surface S1 side is changeable by changing the thickness of the base layer 15. For example, in a case where the thickness of tantalum (Ta) is 1 nm, color development substantially the same as that of gold (Au) is obtainable, whereas in a case where the thickness of tantalum (Ta) is increased, color development in which red is added to gold is obtainable. In this manner, the color development is adjustable by adjusting the thickness of the base layer 15.

(1-3. Workings and Effects)

An exterior housing of an electronic apparatus generally includes a plurality of members. For example, an exterior housing of a smartphone includes a windshield, a frame, and a back surface plate, and an exterior housing of a wristwatch, a watch-type wearable device, or the like includes a glass windshield, a frame, a back surface plate, and a curved structure. Among them, metals, glass, and the like, for example, are used for the frame, and glass, ceramics, and the like, for example, are used for the back surface plate and the curved structure. These are fixed together with the windshield by, for example, a plastic gasket, or bonded to the windshield equipped with a display by an adhesive or the like including an organic material. It is difficult, in the thus combined exterior housing, to secure structural strength and waterproofness. In addition, an adhesive layer is softer than metals and glass, and the adhesive layer is relatively thick. This causes, when dropped, a stress to be concentrated on a region in contact with the glass frame and the region to be easily broken.

In contrast, the present embodiment provides the structure 1 applicable to the exterior housing of the smartphone, the wristwatch, the watch-type wearable device, or the like in which the substrate 11 and the transparent substrate 16 are bonded to each other by atomic diffusion bonding, and a decorative function is added to the bonding layer 12 provided between the substrate 11 and the transparent substrate 16. Specifically, among the base layers 13 and 15 and the diffusion bonding layer 14 included in the bonding layer 12, the diffusion bonding layer 14 and the base layer 15 which is provided on the transparent substrate 16 side are used as the decorative layers.

The atomic diffusion bonding is a technique for bonding homogeneous or heterogeneous materials by an extremely thin metal layer of several nanometers to several tens of nanometers, and its bonding force is extremely strong. In the present embodiment, the substrate 11 and the transparent substrate 16 are bonded by this bonding technique; therefore, in a case where an impact such as dropping occurs, the stress is prevented from concentrating on the transparent substrate 16, and it becomes possible to disperse the impact throughout the structure 1.

In addition, various color developments are obtained by combining a plurality of kinds of metals. For example, color development of gold is changed to pink gold by combining gold with copper, is changed to white gold by combining gold with palladium, and so on. In the present embodiment: the metal material is used for the base layer 13, the diffusion bonding layer 14, and the base layer 15; the base layer 15 on the transparent substrate 16 side is caused to be a thin film having a thickness of less than or equal to 1 nm, for example; and the substrate 11 and the transparent substrate 16 are bonded to each other by atomic diffusion bonding. This makes it possible to confirm color development in which the diffusion bonding layer 14 and the base layer 15 are combined with each other from the transparent substrate 16 side of the structure 1. For example, as illustrated in FIG. 4, provision of the base layer 15 including tantalum (Ta) on the diffusion bonding layer 14 including gold (Au) makes it possible to obtain a reddish gold color.

Further, as described in Table 2, the color development of the structure 1 on the transparent substrate 16 side (the surface S1 side) is adjustable by changing the thickness of the base layer 15 including tantalum (Ta). Still further, it is possible to achieve decorations that differ in color development depending on positions by varying an in-plane thickness of the base layer 15.

As described above, in the structure 1 according to the present embodiment, the substrate 11 and the transparent substrate 16 are bonded to each other by, for example, atomic diffusion bonding, and the color development of the bonding layer 12 is utilized for decoration. That is, the bonding layer 12 is used as the decorative layer. As a result, it becomes possible to improve the design characteristic while improving the bonding strength between the substrate 11 and the transparent substrate 16.

Hereinafter, second and third embodiments and modification examples 1 to 3 will be described, and in the following description, the same components as those of the first embodiment will be denoted by the same reference numerals, and description thereof will be omitted as appropriate.

2. Second Embodiment

Figure 6:
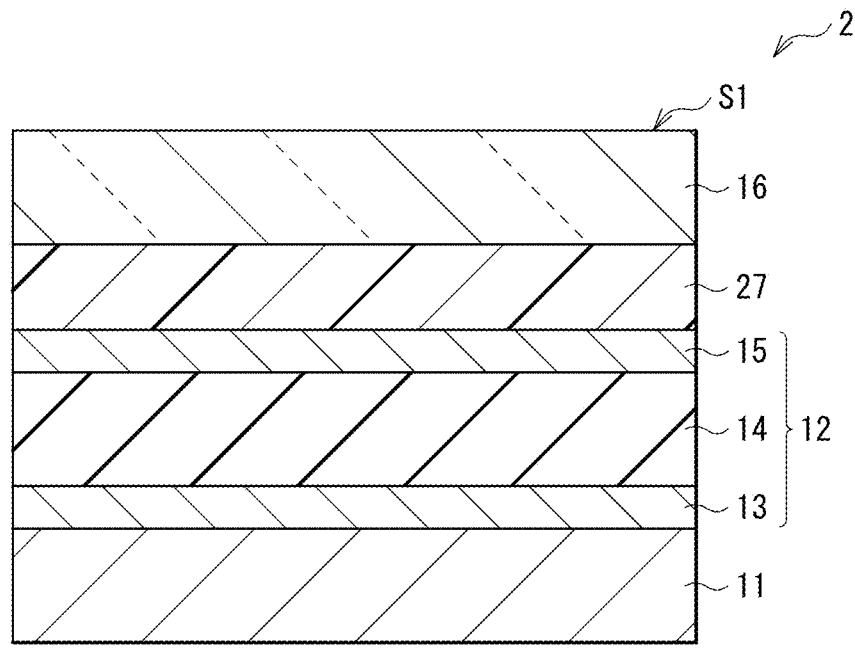
FIG. 6 is a cross-sectional schematic view of a configuration of a structure according to a second embodiment of the present disclosure.

FIG. 6 schematically illustrates a cross-sectional configuration of a structure (a structure 2) according to a second embodiment of the present disclosure. In this structure 2, similarly to the structure 1 according to the first embodiment described above, two or more members to be bonded have a stacked structure in which the members are bonded by, for example, atomic diffusion bonding. The stacked structure is included in, for example, an exterior housing of a smartphone, a wristwatch, a watch-type wearable device, or the like (see, for example, FIG. 13). The structure 2 according to the present embodiment includes: the substrate (the transparent substrate 16) having a light-transmitting property; the substrate 11 opposed to the transparent substrate 16; the bonding layer 12 having a bonding function and a decorative function between the substrate 11 and the transparent substrate 16; and a decorative layer 27 that further adds the decorative function. In the present embodiment, the bonding layer 12 corresponds to a specific example of the "bonding layer" and the "second decorative layer" of the present disclosure, and the decorative layer 27 corresponds to a specific example of the "first decorative layer" of the present disclosure.

The structure 2 has the substrate 11 and the transparent substrate 16 bonded together by, for example, atomic diffusion bonding. The structure 2 has a configuration in which the substrate 11, the bonding layer 12, the decorative layer 27, and the transparent substrate 16 are stacked in this order. In a similar manner as in the above-described first embodiment: the bonding layer 12 includes the base layer 13, the diffusion bonding layer 14, and the base layer 15, for example; and the base layer 13, the diffusion bonding layer 14, and the base layer 15 are stacked in this order from the substrate 11 side.

The decorative layer 27 is for decorating the structure 1, and includes a dielectric multilayer film, for example. Examples of materials included in the dielectric multilayer film include silicon oxide ($SiO_2$), silicon nitride ($Si_3N_4$), titanium oxide ($TiO_2$), niobium oxide ($Nb_2O_5$), tantalum oxide ($Ta_2O_5$), titanium alloy oxide, aluminum oxide ($Al_2O_3$), and aluminum alloy oxide. As an example of the decorative layer 27, there is given a film in which silicon oxide ($SiO_2$) films and titanium oxide ($TiO_2$) films are alternately stacked, for example, 20 layers in total.

In a similar manner as in the above-described first embodiment, in the structure 2, the base layer 13 and the metal layer 14A are formed on the substrate 11. On the transparent substrate 16, the transparent substrate 16 is polished until the arithmetic average roughness (Ra) is less than 1 nm, following which the dielectric multilayer film having 20 layers including $TiO_2$ films and $SiO_2$ films is formed, to thereby form the decorative layer 27. Thereafter, the base layer 15 and the metal layer 14B are sequentially formed over the decorative layer 27. Thereafter, in a similar manner as in the above-described first embodiment, the substrate 11 and the transparent substrate 16 are disposed to oppose each other in such a manner that the metal layers 14A and 14B oppose each other, and are pressurized at 30 MPa and heated at 150° C. for 10 minutes, for example. Thus, the metal layers 14A and 14B are bonded to each other and the structure 2 illustrated in FIG. 2 is completed.

Figure 7:
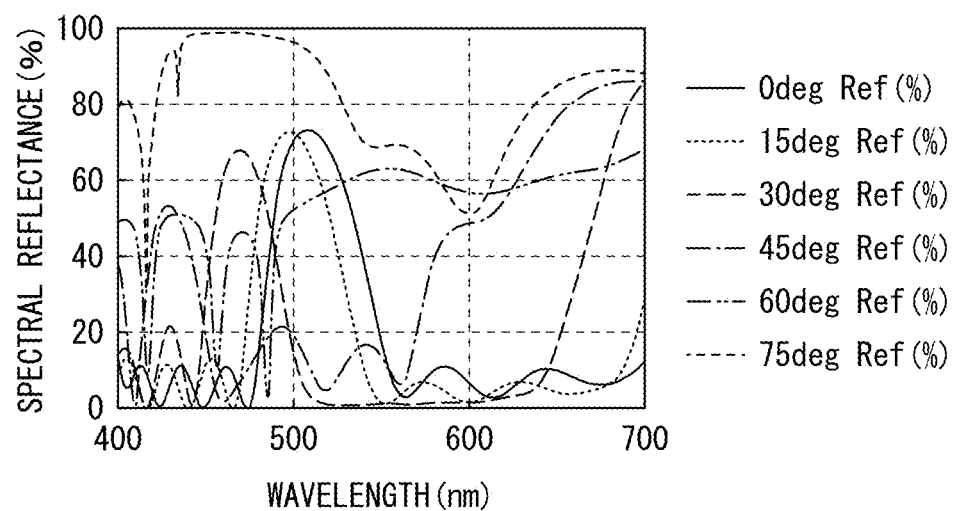
FIG. 7 is a spectral reflectance characteristic diagram of a surface of the structure illustrated in FIG. 6.

In the structure 2 according to the present embodiment, the decorative layer 27 including the dielectric multilayer film is further provided on the bonding layer 12. Table 3 describes examples of materials and thicknesses of the respective members included in the structure 2. FIG. 7 illustrates a relationship between a wavelength and a spectral reflectance at each angle of incidence, on the surface S1 side of the structure 2 having the configuration described in Table 3. In the structure 2, green color development is confirmed in a direction perpendicular to the surface S1 (0 degree), and, with increase in the angle, color development varies from green to cyan (about 15 degrees), from cyan to magenta (about 40 degrees), from magenta to pink (about 45 degrees), from pink to gold (about 50 degrees), and from gold to silver (about 60 degrees).

TABLE 3

|  | Material | Thickness |
|---|---|---|
| Substrate 11 | Al | — |
| Base layer 13 | Ta | 1 nm |
| Diffusion bonding layer 14 | Au | 200 nm |
| Base layer 15 | Ta | 30 nm |
| Decorative layer 27 | $TiO_2/SiO_2$ | 20 layers |
| Transparent substrate 16 | $SiO_2$ (glass) | — |

As described above, in the structure 2 according to the present embodiment, the substrate 11 and the transparent substrate 16 are bonded to each other by, for example, atomic diffusion bonding, and the decorative layer 27 including the dielectric multilayer film is provided between the bonding layer 12 and the transparent substrate 16. This makes it possible to add decoration whose color development varies depending on viewing angles owing to an interference effect of the dielectric multilayer film included in the decorative layer 27. That is, in addition to the effect of the above-described first embodiment, it is possible to further improve the design characteristic.

3. Modification Example 1

Figure 8:
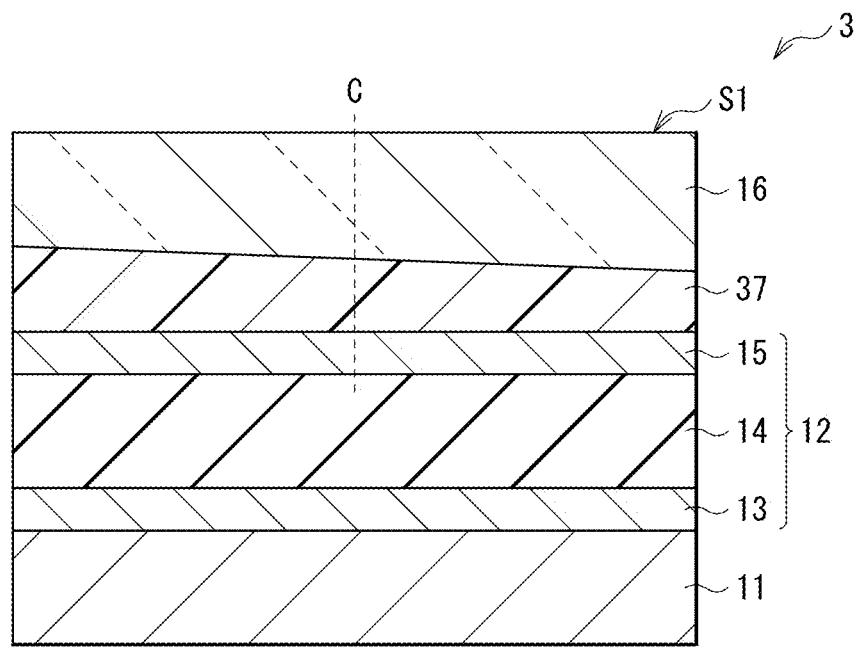
FIG. 8 is a cross-sectional schematic view of a configuration of a structure according to a modification example 1 of the present disclosure.

FIG. 8 schematically illustrates a cross-sectional configuration of a structure (a structure 3) according to a modification example (a modification example 1) of the present disclosure. In this structure 3, similarly to the structure 1 according to the first embodiment described above, two or more members to be bonded have a stacked structure in which the members are bonded by, for example, atomic diffusion bonding. The stacked structure is included in, for example, an exterior housing of a smartphone, a wristwatch, a watch-type wearable device, or the like (see, for example, FIG. 13). The structure 3 according to the present modification example is different from that of the second embodiment in that a decorative layer 37 has thickness distribution in a plane. The decorative layer 37 is provided between: the substrate (the transparent substrate 16) having a light-transmitting property; and the bonding layer 12.

The decorative layer 37 is for decorating the structure 1, and includes a dielectric multilayer film, for example, in a similar manner to the decorative layer 27 of the second embodiment described above. As an example of the dielectric multilayer film, there is given a film in which silicon oxide ($SiO_2$) films and titanium oxide ($TiO_2$) films are alternately stacked, for example, 20 layers in total.

Figure 9:
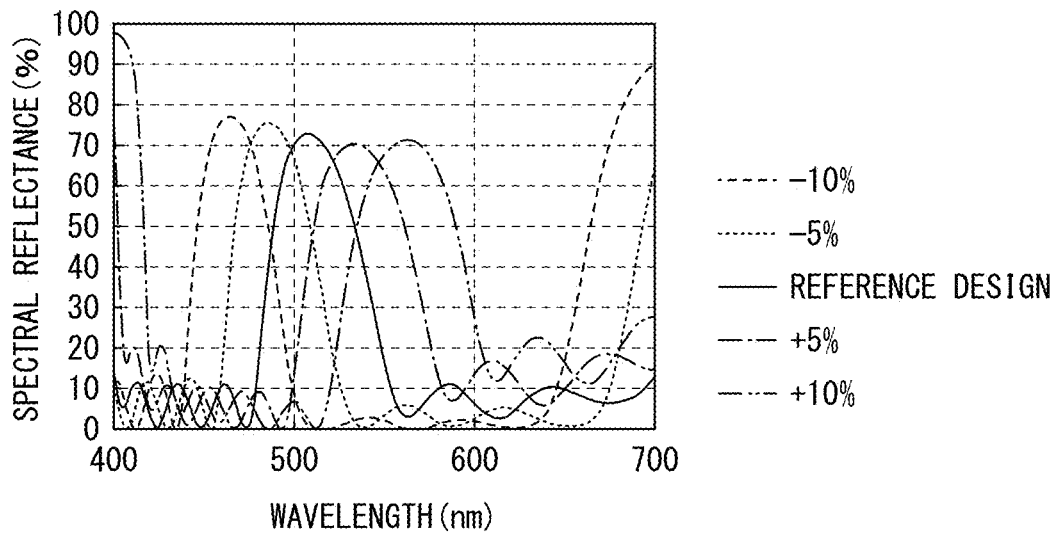
FIG. 9 is a spectral reflectance characteristic diagram of a surface of a structure including a decorative layer having respective film thicknesses.

The structure 3 according to the present modification example is provided with, on the bonding layer 12, the decorative layer 37 including the dielectric multilayer film having thickness distribution in the plane. For example, in the structure 3 illustrated in FIG. 8, the decorative layer 37 is provided in which the thickness decreases gradually from the left end toward the right end in the drawing. FIG. 9 illustrates a relationship between a wavelength and a spectral reflectance at each of a C point of the surface S1 side of the structure 2, a +5% point, a +10% point, a −5% point, and a −10% point of a standard design. The C point of the decorative layer 37 represents a design center (the standard design). The structure 3 according to the present modification example has color development in xy chromaticity diagram of, from the left end to the right end with the C point serving as the standard design as the center, for example: (x: 0.3851, y: 0.4838) at the +10% point; (x: 0.2937, y: 0.05750) at the +5% point; (x: 0.1953, y: 0.5348) at the standard design point (0%, the C point); (x: 0.1414, y: 0.2679) at the −5% point; and (x: 0.1663, y: 0.0857) at the −10% point. In other words, the structure 3 according to the present modification example is able to obtain different color development depending on the position.

TABLE 4

| | Material | Thickness |
|---|---|---|
| Substrate 11 | Al | — |
| Base layer 13 | Ta | 1 nm |
| Diffusion bonding layer 14 | Au | 200 nm |
| Base layer 15 | Ta | 30 nm |
| Decorative layer 27 | $TiO_2/SiO_2$ | 20 layers (with gradient) |
| Transparent substrate 16 | $SiO_2$ (glass) | — |

As described above, in the structure 3 according to the present modification example, the substrate 11 and the transparent substrate 16 are bonded to each other by, for example, atomic diffusion bonding, and the decorative layer 37 including the dielectric multilayer film having thickness distribution in the plane is provided between the bonding layer 12 and the transparent substrate 16. This makes it possible to achieve decorations of different colors depending on any positions in the plane. That is, in addition to the effect of the above-described first embodiment, it is possible to further improve the design characteristic.

4. Third Embodiment

Figure 10:
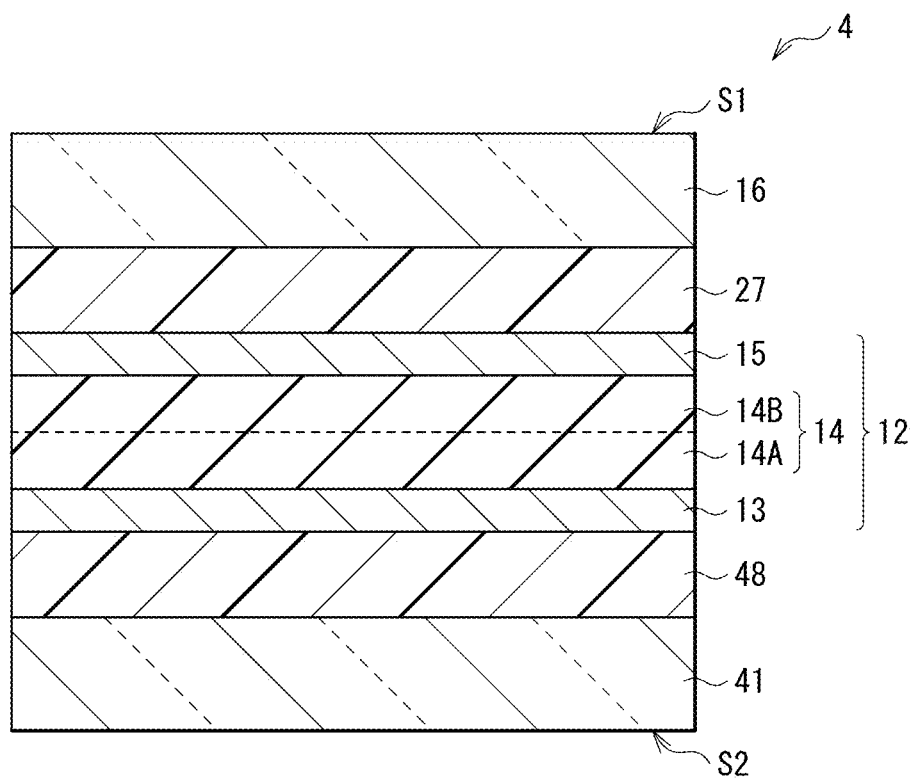
FIG. 10 is a cross-sectional schematic view of a structure according to a third embodiment of the present disclosure.

FIG. 10 schematically illustrates a cross-sectional configuration of a structure (a structure 4) according to a third embodiment of the present disclosure. In this structure 4, similarly to the structure 1 according to the first embodiment described above, two or more members to be bonded have a stacked structure in which the members are bonded by, for example, atomic diffusion bonding. The stacked structure is included in, for example, an exterior housing of a smartphone, a wristwatch, a watch-type wearable device, or the like (see, for example, FIG. 13). The structure 4 according to the present embodiment includes: two substrates (a transparent substrate 41 and the transparent substrate 16) each having a light-transmitting property; the bonding layer 12 having a bonding function and a decorative function between the transparent substrate 41 and the transparent substrate 16; and the decorative layer 27 and a decorative layer 48 on the respective sides of the bonding layer 12. In the present embodiment, the bonding layer 12 corresponds to a specific example of the "bonding layer" and the "second decorative layer" of the present disclosure. The decorative layer 27 corresponds to a specific example of the "first decorative layer" of the present disclosure. The decorative layer 48 corresponds to a specific example of a "third decorative layer".

The structure 4 has the transparent substrate 41 and the transparent substrate 16 bonded together by, for example, atomic diffusion bonding. The structure 4 has a configuration in which the transparent substrate 41, the decorative layer 48, the bonding layer 12, the decorative layer 27, and the transparent substrate 16 are stacked in this order. In a similar manner as in the above-described first embodiment: the bonding layer 12 includes the base layer 13, the diffusion bonding layer 14, and the base layer 15, for example; and the base layer 13, the diffusion bonding layer 14, and the base layer 15 are stacked in this order from the substrate 11 side. In the structure 4 according to the present embodiment, color development of the bonding layer 12 and the decorative layer 27 is confirmable on the surface S1 side, and color development of the bonding layer 12 and the decorative layer 48 is confirmable on a surface S2 side.

The transparent substrate 41 is, for example, a plate-shaped member having one surface and another surface opposed to each other, and corresponds to a specific example of the "second substrate" of the present disclosure. The transparent substrate 41 includes an inorganic material or a plastic material having a light-transmitting property. Examples of the inorganic material include silicon oxide ($SiO_x$) and aluminum oxide ($AlO_x$). Silicon oxide includes glass, spin-on-glass (SOG), or the like. Examples of the plastic material include polycarbonate (PC), polyethylene terephthalate (PET), polyethylene naphthalate (PEN), acrylic (PMMA), cycloolefin polymer (COP), and polyethyl ether ketone (PEEK).

Similarly to the decorative layer 27 according to the second embodiment described above, the decorative layer 48 is for decorating the structure 4, and includes a dielectric multilayer film, for example. Examples of materials included in the dielectric multilayer film include silicon oxide ($SiO_2$), silicon nitride ($Si_3N_4$), titanium oxide ($TiO_2$), niobium oxide ($Nb_2O_5$), tantalum oxide ($Ta_2O_5$), titanium alloy oxide, aluminum oxide ($Al_2O_3$), and aluminum alloy oxide. As an example of the decorative layer 48, there is given a film in which silicon oxide ($SiO_2$) films and titanium oxide ($TiO_2$) films are alternately stacked, for example, 20 layers in total. A configuration of the dielectric multilayer film included in the decorative layer 27 and a configuration of the dielectric multilayer film included in the decorative layer 48 may be the same or different from each other. Use of the dielectric multilayer films having different configurations between the decorative layer 27 and the decorative layer 48 causes different color variations to be respectively obtained on the surface S1 side and on the surface S2 side.

As described above, in the structure 4 according to the present embodiment, the two substrates that are bonded by the bonding layer 12 respectively include the transparent substrates (the transparent substrates 41 and 16). This makes it possible to confirm the color development of the bonding layer 12 and the decorative layer 27 and the color development of the bonding layer 12 and the decorative layer 48 on the respective sides (the surface S1 side and the surface S2 side) of the structure 4. Further, the decorative layer 48 is provided between the transparent substrate 41 and the bonding layer 12. This makes it possible to add, also on the surface S2 side, decoration whose color development varies depending on viewing angles owing to an interference effect of the dielectric multilayer film included in the decorative layer 48. Still further, the decorative layer 27 and the decorative layer 48 include the respective dielectric multilayer films having different configurations from each other. This makes it possible to confirm color developments that are different from each other on the surface S1 side and on the surface S2 side. In other words, in addition to the effect of the above-described first embodiment, it is possible to further improve the design characteristic.

5. Modification Example 2

Figure 11:
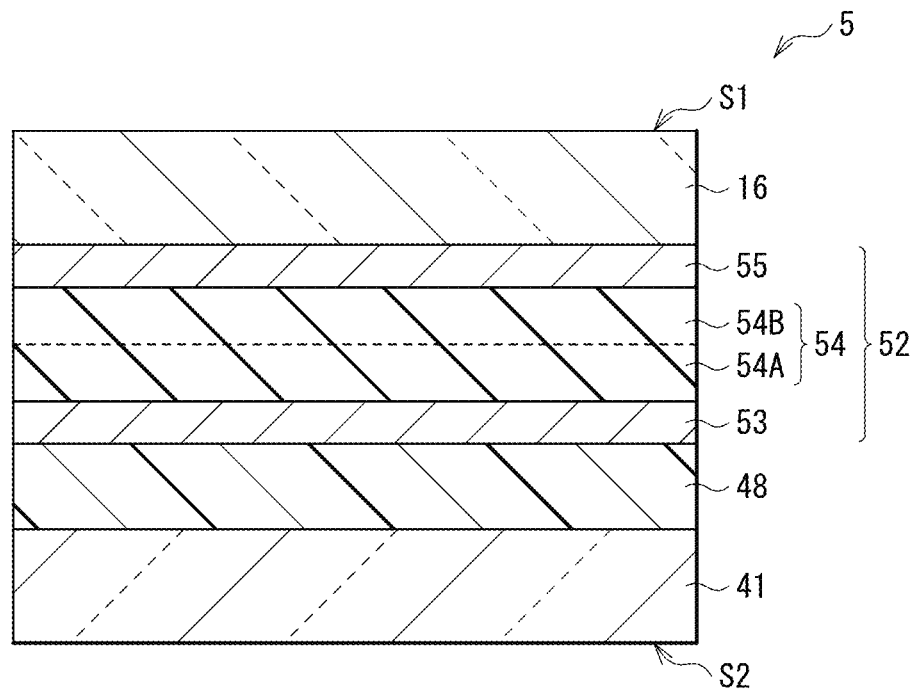
FIG. 11 is a cross-sectional schematic view of a configuration of a structure according to a modification example 2 of the present disclosure.

FIG. 11 schematically illustrates a cross-sectional configuration of a structure (a structure 5) according to a modification example (a modification example 2) of the present disclosure. In this structure 5, similarly to the structure 1 according to the first embodiment described above, two or more members to be bonded have a stacked structure in which the members are bonded by, for example, atomic diffusion bonding. The stacked structure is included in, for example, an exterior housing of a smartphone, a wristwatch, a watch-type wearable device, or the like (see, for example, FIG. 13). The structure 5 according to the present modification example is provided with the decorative layer 48 between: a bonding layer 52 that is provided between the transparent substrate 41 and the transparent substrate 16 and has a bonding function and a decorative function; and the transparent substrate 41. The bonding layer 52 is formed by using a material that is able to be made transparent.

The structure 5 has the transparent substrate 41 and the transparent substrate 16 bonded to each other by, for example, atomic diffusion bonding, and has a configuration in which the transparent substrate 41, the decorative layer 48, the bonding layer 52, and the transparent substrate 16 are stacked in this order. The bonding layer 52 includes, for example, a base layer 53, a diffusion bonding layer 54, and a base layer 55. The base layer 53, the diffusion bonding layer 54, and the base layer 55 are stacked in this order from a transparent substrate 41 side.

The base layer 53 and the base layer 55 each include, for example, a material that is able to supply oxygen to the diffusion bonding layer 54, i.e., an inorganic material (inorganic oxide) combined with oxygen. Specific examples thereof include silicon oxide ($SiO_x$), aluminum oxide ($AlO_x$), niobium oxide ($NbO_x$), titanium oxide ($TiO_x$), tantalum oxide ($Ta_2O_5$), aluminum lanthanum oxide ($AlLaO_x$), titanium lanthanum oxide ($TiLaO_x$), and hafnium oxide ($HfO_x$). A thickness in a stacking direction of the base layer 53 and a thickness in a stacking direction of the base layer 55 are each preferably greater than or equal to 10 nm and less than or equal to 10 μm, for example.

The diffusion bonding layer 54 is for bonding the transparent substrate 41 to the transparent substrate 16 in the bonding layer 52. The diffusion bonding layer 54 includes a metal material which is oxidized by oxygen supplied from the base layer 53 and the base layer 55 and which is able to be made transparent. Examples of the material included in the diffusion bonding layer 54 include aluminum (Al), titanium (Ti), vanadium (V), chromium (Cr), iron (Fe), cobalt (Co), nickel (Ni), copper (Cu), zinc (Zn), gallium (Ga), germanium (Ge), zirconium (Zr), niobium (Nb), molybdenum (Mo), ruthenium (Ru), rhodium (Rh), palladium (Pd), silver (Ag), indium (In), tin (Sn), hafnium (Hf), and tantalum (Ta). A thickness of the diffusion bonding layer 54 is preferably greater than or equal to 0.2 nm and less than or equal to 10 nm, for example.

The structure 5 is manufacturable in the following manner, for example. First, a dielectric multilayer film including 20 layers of $TiO_2$ films and $SiO_2$ films is formed on the transparent substrate 41 by sputtering, for example, to thereby form the decorative layer 48. Thereafter, a $SiO_2$ film, for example, is formed as the base layer 53 on the decorative layer 48 to a thickness of 5000 nm, for example, by ion-assisted deposition, for example. Further, a $SiO_2$ film, for example, is formed as the base layer 55 on the transparent substrate 16 to a thickness of 5000 nm, for example, by a similar process. Next, a surface of the base layer 53 and a surface of the base layer 55 are each polished by optical polishing, for example, to each have an arithmetic average roughness of less than 0.3 nm, for example. Thereafter, respective Ti films are formed as metal layers 54A and 54B, which are to be the diffusion bonding layer 54, on the base layer 53 and the base layer 55 by a sputtering method, for example, in an ultra-high vacuum environment. Next, in the ultra-high vacuum environment, the transparent substrate 41 and the transparent substrate 16 are disposed to oppose each other in such a manner that the metal layers 54A and 54B oppose each other, and are pressurized at 30 MPa, for example. Thereafter, as a post-treatment, heating is performed at 300° C. for 10 hours in a general environment. Thus, oxygen included in the base layer 53 and the base layer 55 diffuses into the diffusion bonding layer 54, and the Ti film is oxidized. As a result, the structure 5 in which the diffusion bonding layer 54 is made transparent is completed.

As described above, in the structure 5 according to the present modification example, the base layer 53 and the base layer 55 are each formed using the material that is able to supply oxygen to the diffusion bonding layer 54, and the diffusion bonding layer 54 is formed by using the material that is able to be made transparent by oxidation. Thus, annealing treatment after atomic diffusion bonding, for example, causes the diffusion bonding layer 54 to be oxidized to thereby become transparent. In other words, in the structure 5, color development of the decorative layer 48 through the transparent substrate 16 and the bonding layer 52 is confirmable from the surface S1 side, and color development of the decorative layer 48 through the transparent substrate 41 is confirmable from the surface S2 side. That is, in addition to the effect of the above-described first embodiment, it is possible to further improve the design characteristic.

6. Modification Example 3

Figure 12:
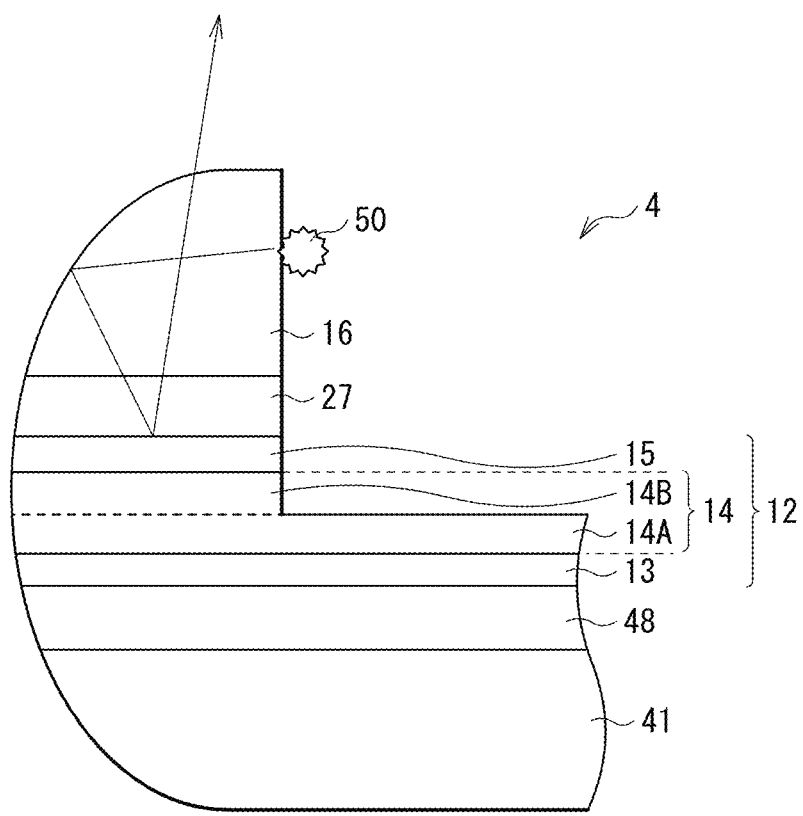
FIG. 12 is a cross-sectional schematic view of a configuration of a structure according to a modification example 3 of the present disclosure.

FIG. 12 schematically illustrates a cross-sectional configuration of a structure (a structure 6) according to a modification example (a modification example 3) of the present disclosure. In this structure 6, similarly to the structure 1 according to the first embodiment described above, two or more members to be bonded have a stacked structure in which the members are bonded by, for example, atomic diffusion bonding. The stacked structure is included in, for example, an exterior housing of a smartphone, a wristwatch, a watch-type wearable device, or the like (see, for example, FIG. 13). In the structure 6 according to the present modification example, a light-emitting element 50 to be a light source is disposed near the transparent substrate 16, for example. The light-emitting element 50 corresponds to a specific example of a "functional element" of the present disclosure.

The structure 6 has the transparent substrate 41 and the transparent substrate 16 bonded to each other by, for example, atomic diffusion bonding, and has a configuration in which the transparent substrate 41, the decorative layer 48, the bonding layer 12, the decorative layer 27, and the transparent substrate 16 are stacked in this order. In a similar manner as in the above-described third embodiment: the bonding layer 12 includes the base layer 13, the diffusion bonding layer 14, and the base layer 15, for example; and the base layer 13, the diffusion bonding layer 14, and the base layer 15 are stacked in this order from a transparent substrate 11 side.

Figure 13:
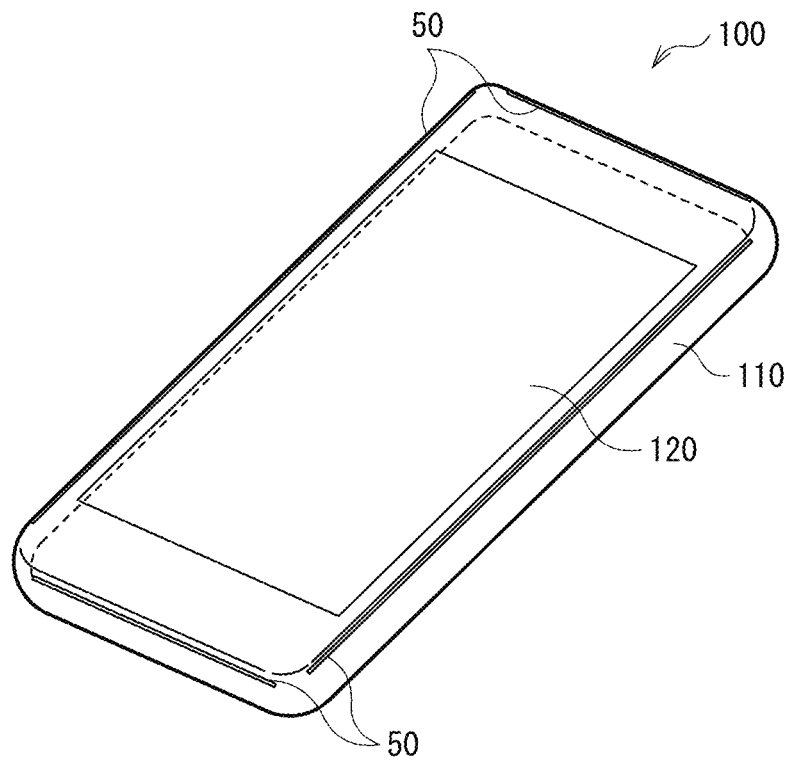
FIG. 13 is an external view of a working example 1 using the structure illustrated in FIG. 12.

FIG. 13 schematically illustrates an external view of a smartphone 100 (a working example 1) including the structure 6 illustrated in FIG. 12. The smartphone 100 includes, for example, an exterior housing 110 and a display section 120, and the structure 6 according to the present modification example is applied to the exterior housing 110. Specifically, the transparent substrate 41 corresponds to, for example, a back plate, and the transparent substrate 16 corresponds to a frame. In the present modification example, after the transparent substrate 41 and the transparent substrate 16 are bonded together by, for example, atomic diffusion bonding, an outer shape of the structure 6 is subjected to, for example, arc processing and mirror polishing, and the light-emitting element 50 is disposed, for example, near an inner side surface S3 of the transparent substrate 16.

If the light-emitting element 50 is disposed near the transparent substrate 16 corresponding to the frame, for example, as illustrated in FIG. 12, light emitted from the light-emitting element 50 is reflected on a side surface of the transparent substrate 16, for example, and is further reflected on an interface of the bonding layer 12, for example. The light reflected on the interface of the bonding layer 12 travels inside the transparent substrate 16, for example, and the light is outputted from the structure 6 in a color corresponding to a characteristic. As a result, the smartphone 100 such as the one illustrated in FIG. 13 is able to cause only an edge of the frame to emit any light, for example. Further, the processing to which the outer shape of the structure 5 is subjected is not limited to the circular arc processing, and may be processing of various shapes to thereby make it possible to achieve further various decorations.

7. Working Examples

The structures 1 to 6 described in the first to third embodiments and the modification examples 1 to 3 are each able to be applied to an exterior housing of various electronic apparatuses such as a wristwatch and a watch-type wearable device in addition to the exterior housing of the smartphone described in the modification example 3.

Figure 14:
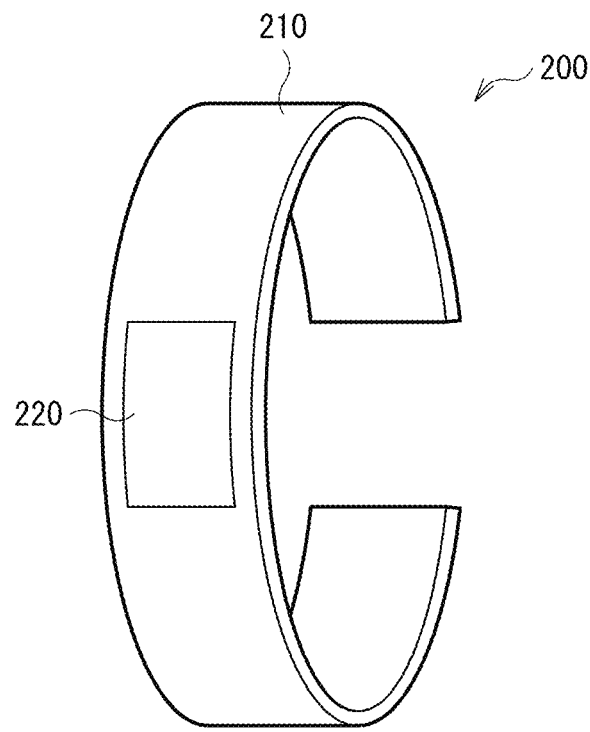
FIG. 14 is an external view of a wearable device according to a working example 2 of the present disclosure.

FIG. 14 illustrates an external view of a watch-type wearable device 200. The watch-type wearable device 200 includes, for example, an exterior housing 210 having a curved structure used for mounting on arms and the like, and a display section 220. Any one of the above-described structures 1 to 6 is usable for the exterior housing 210. This makes it possible to enhance a structural strength while decorating the housing.

Although the present disclosure has been described with reference to the first to third embodiments, the modification examples 1 to 3, and the working examples, the present disclosure is not limited to modes described in the above embodiments and the like, and various modifications can be made.

In addition, it is not necessary to include all of the components described in the above embodiments and the like, and other components may be further included. For example, in the above modification example 3, decoration and decoration with layers or thin films may be performed on an entire surface or a portion of a side surface and a back surface (the surface S2 side) of the structure 6 in which the side surface is subjected to the arc processing. The decoration makes it possible, for example, to add further decorative effects by causing a light beam to travel inside the transparent substrate 16 and outputting light from a limited area. Also, depending on the design, it is possible to add an illumination effect.

Further, the materials and thicknesses of the above-described components are merely examples, and are not limited to those described.

It should be noted that effects of an example embodiment and modification examples of the disclosure are not limited to those described herein. The disclosure may further include any effects other than those described herein.

It is to be noted that the present disclosure may have the following configurations. According to the present technology having the following configurations, a bonding layer is provided between a first substrate and a second substrate that are opposed to each other, and a first decorative layer is provided between the first substrate and the bonding layer. This makes it possible to improve a design characteristic while improving a bonding strength between the first substrate and the second substrate.

(1)
A structure including:
a first substrate;
a second substrate opposed to the first substrate;
a bonding layer provided between the first substrate and the second substrate; and
a first decorative layer provided between the first substrate and the second substrate.

(2)

The structure according to (1), in which the first substrate has a light-transmitting property.

(3)

The structure according to (1) or (2), in which the first decorative layer is provided between the first substrate and the bonding layer.

(4)

The structure according to any one of (1) to (3), in which the first decorative layer includes a dielectric multilayer film.

(5)

The structure according to any one of (1) to (4), in which the first decorative layer has different thicknesses in an in-plane direction.

(6)

The structure according to (1), in which the bonding layer serves as the first decorative layer.

(7)

The structure according to (6), in which
 the bonding layer includes a first base layer, a metal bonding layer, and a second base layer in order from a side of the first substrate, and
 at least one of the first base layer or the metal bonding layer serves as the first decorative layer.

(8)

The structure according to any one of (1) to (7), further including a second decorative layer between the first substrate and the second substrate.

(9)

The structure according to (8), in which the bonding layer serves as the second decorative layer.

(10)

The structure according to (9), in which
 the bonding layer includes a first base layer, a metal bonding layer, and a second base layer in order from a side of the first substrate, and
 one of the first base layer and the metal bonding layer serves as the first decorative layer, and another of the first base layer and the metal bonding layer serves as the second decorative layer.

(11)

The structure according to any one of (1) to (10), in which the second substrate has a light-transmitting property.

(12)

The structure according to (11), further including a third decorative layer between the second substrate and the bonding layer.

(13)

An exterior housing including a structure, the structure including
 a first substrate,
 a second substrate opposed to the first substrate,
 a bonding layer provided between the first substrate and the second substrate, and
 a first decorative layer provided between the first substrate and the second substrate.

(14)

The exterior housing according to (13), further including a functional element.

(15)

The exterior housing according to (14), in which the functional element is a light-emitting element.

(16)

The exterior housing according to (15), in which the light-emitting element is disposed on a side surface of the first substrate.

This application claims the benefit of Japanese Priority Patent Application JP2019-000663 filed with the Japan Patent Office on Jan. 7, 2019, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. A structure, comprising:
 a first substrate;
 a second substrate opposed to the first substrate;
 a bonding layer provided between the first substrate and the second substrate; and
 a first decorative layer provided between the first substrate and the second substrate, wherein the first decorative layer includes a dielectric multilayer film, wherein the first decorative layer has a first thickness at a first end of the first decorative layer, wherein the first decorative layer has a second thickness at a second end of the first decorative layer, and wherein the first thickness is different than the second thickness.

2. The structure according to claim 1, wherein the first substrate has a light-transmitting property.

3. The structure according to claim 1, wherein the first decorative layer is provided between the first substrate and the bonding layer.

4. The structure according to claim 1, wherein the bonding layer serves as the first decorative layer.

5. The structure according to claim 1, further comprising a second decorative layer provided between the first substrate and the second substrate.

6. The structure according to claim 5, wherein the bonding layer serves as the second decorative layer.

7. The structure according to claim 1, wherein the second substrate has a light-transmitting property.

8. A structure, comprising:
 a first substrate;
 a second substrate opposed to the first substrate;
 a bonding layer provided between the first substrate and the second substrate; and
 a first decorative layer provided between the first substrate and the second substrate,
 wherein the bonding layer serves as the first decorative layer,
 wherein the bonding layer includes a first base layer, a metal bonding layer, and a second base layer in order from a side of the first substrate, and
 wherein at least one of the first base layer or the metal bonding layer serves as the first decorative layer.

9. The structure according to claim 8, wherein the second substrate has a light-transmitting property.

10. A structure, comprising:
 a first substrate;
 a second substrate opposed to the first substrate;
 a bonding layer provided between the first substrate and the second substrate;
 a first decorative layer provided between the first substrate and the second substrate; and
 a second decorative layer provided between the first substrate and the second substrate,
 wherein the bonding layer serves as the second decorative layer,
 wherein the bonding layer includes a first base layer, a metal bonding layer, and a second base layer in order from a side of the first substrate, and wherein one of the first base layer and the metal bonding layer serves as the first decorative layer, and another of the first base layer and the metal bonding layer serves as the second decorative layer.

11. The structure according to claim 10, wherein the second substrate has a light-transmitting property.

12. An exterior housing comprising a structure, the structure including:
- a first substrate;
- a second substrate opposed to the first substrate;
- a bonding layer provided between the first substrate and the second substrate;
- a first decorative layer provided between the first substrate and the second substrate, wherein the first decorative layer includes a dielectric multilayer film; and
- a functional element, wherein the functional element is a light-emitting element, and wherein the light-emitting element is disposed on a side surface of the first substrate.

13. The structure according to claim 12, wherein the first substrate has a light-transmitting property.

14. The structure according to claim 12, wherein the second substrate has a light-transmitting property.

15. The structure according to claim 12, wherein the first decorative layer is provided between the first substrate and the bonding layer.

16. The structure according to claim 12, wherein the first decorative layer has a first thickness at a first end of the first decorative layer, wherein the first decorative layer has a second thickness at a second end of the first decorative layer, and wherein the first thickness is different than the second thickness.

17. The structure according to claim 12, further comprising a second decorative layer provided between the first substrate and the second substrate.

* * * * *